United States Patent [19]
Buswell et al.

[11] Patent Number: 5,464,606
[45] Date of Patent: Nov. 7, 1995

[54] TWO-STAGE WATER GAS SHIFT CONVERSION METHOD

[75] Inventors: Richard F. Buswell, Glastonbury; Joseph V. Clausi, Portland, both of Conn.; Craig Louie, Vancouver, Canada

[73] Assignee: Ballard Power Systems Inc., North Vancouver, Canada

[21] Appl. No.: 250,370

[22] Filed: May 27, 1994

[51] Int. Cl.[6] .................................................. C01B 3/12
[52] U.S. Cl. ........................ 423/655; 422/190; 422/191; 422/200; 423/656
[58] Field of Search ............................... 423/655, 656; 422/190, 191, 200, 201, 203, 211

[56] References Cited

U.S. PATENT DOCUMENTS

| | | | |
|---|---|---|---|
| 2,078,947 | 5/1937 | Houdry et al. | 422/200 |
| 2,248,993 | 7/1941 | Houdry | 422/200 |
| 2,740,803 | 4/1956 | Dorschner | 422/201 |
| 3,409,074 | 11/1968 | Wagner et al. | 422/201 |
| 3,666,682 | 5/1972 | Muenger | 423/655 |
| 3,746,515 | 7/1973 | Friedman. | |
| 3,796,547 | 3/1974 | Muenger | 422/200 |
| 3,825,501 | 7/1974 | Muenger | 423/656 |
| 4,128,700 | 12/1978 | Sederquist. | |
| 4,258,006 | 3/1981 | Flockenhaus et al. | 422/200 |
| 4,476,683 | 10/1984 | Shal et al. | 423/655 |
| 4,554,223 | 11/1985 | Yokoyama et al.. | |
| 4,994,331 | 2/1991 | Cohen. | |
| 5,149,600 | 9/1992 | Yamase et al.. | |
| 5,271,916 | 12/1993 | Vanderborgh et al.. | |
| 5,358,696 | 10/1994 | Jahnke | 423/656 |

Primary Examiner—Wayne Langel
Attorney, Agent, or Firm—McAndrews, Held & Malloy, Ltd.

[57] ABSTRACT

A method and apparatus are provided for reducing the concentration of carbon monoxide in a gaseous reactant stream comprising carbon monoxide and water vapor. The catalyst bed of a water gas shift reactor is preferably divided into two sections. Alternatively, an assembly which includes two sequential reactors can be employed. The first section or reactor operates in an adiabatic fashion whereas the second section or reactor is cooled, thereby facilitating the further conversion of carbon monoxide in the second section or reactor. The gaseous reactant stream exiting the second section or reactor typically has a carbon monoxide concentration in the range from about 0.06% to about 0.14% by volume.

7 Claims, 9 Drawing Sheets

TWO-STAGE WATER GAS SHIFT CONVERSION METHOD

FIELD OF THE INVENTION

The present invention relates to water gas shift conversion. More particularly, the present invention relates to a water gas shift conversion method, and apparatus therefor, which employs a two-stage system to increase the amount of carbon monoxide converted beyond that converted in conventional techniques.

BACKGROUND OF THE INVENTION

The catalytic water gas shift conversion process is well known and is commonly used in processes which manufacture hydrogen gas. In the water gas shift reactor, carbon monoxide is combined with water to yield carbon dioxide and hydrogen according to the following formula:

$$CO + H_2O \rightarrow CO_2 + H_2.$$

This reaction, commonly known as the water gas shift reaction, is highly exothermic, liberating about 16,700 BTUs for each pound mole of carbon monoxide converted. Water gas shift reactors are often used to reduce the amount of carbon monoxide present in a gas stream typically composed of water vapor, methane, carbon monoxide, carbon dioxide and hydrogen.

Water gas shift reactors are particularly useful in hydrocarbon fueled electric power generation systems which utilize ion exchange membrane based electrochemical fuel cells. In these systems, natural gas, or some other suitable hydrocarbon gas, is first reformed in a catalytic hydrocarbon reformer to yield a mixture of hydrogen, carbon dioxide and small amounts of carbon monoxide. This gas mixture is commonly referred to as reformate. The reformate gas is then introduced into the water gas shift reactor, where the carbon monoxide concentration is reduced in order to avoid poisoning by the carbon monoxide of the catalyst employed in the fuel cells and to produce additional hydrogen fuel. In many instances, the reformate stream exiting the water gas shift reactor is introduced into a selective oxidizer, which further reduces the level of carbon monoxide present in the stream.

The conventional water gas shift reactor is an adiabatic bed in which the process gas temperature increases as the amount of carbon monoxide is reduced by the water gas shift reaction. Practically speaking, due to equilibrium limitations, catalyst activity, and catalyst thermal limits, conventional water gas shift reactors are generally incapable of reducing the carbon monoxide concentration of a reformate stream much below 0.8%.

The carbon monoxide concentration of a reformate stream can be reduced below 0.8% through the use of a second adiabatic catalyst bed. However, because of equilibrium limitations, a second adiabatic bed would necessarily operate at a lower temperature relative to the first bed. As a result, the catalyst activity in the second adiabatic bed would be so low that the size of the catalyst bed necessary to achieve any meaningful reduction in carbon monoxide concentration would be prohibitively large from an economic and efficiency standpoint.

Therefore, it is an object of the present invention to provide a water gas shift conversion process, and apparatus therefor, that is capable of economically reducing the carbon monoxide concentration of a reformate stream well below the concentration achieved in conventional processes.

It is a further object of the present invention to provide a water gas shift conversion process which reduces the concentration of carbon monoxide in a reformate stream in order to avoid poisoning of the catalyst employed in the associated fuel cell or cells to which the reformate stream is introduced.

It is a still further object of the present invention to provide a water gas shift conversion process which utilizes one adiabatic reactor bed and one cooled reactor bed.

SUMMARY OF THE INVENTION

The above and other objects are achieved by a water gas shift conversion method comprising the following steps:
(a) providing a water gas shift reactor comprising:
   (1) a first reactor section having an inlet and a first quantity of catalyst disposed therein, the catalyst promoting a water gas shift reaction; and
   (2) a second reactor section in fluid communication with the first reactor section, the second reactor section having an outlet and a second quantity of catalyst disposed therein, the second section in heat exchange relationship with a coolant fluid;
(b) introducing a gaseous reactant stream comprising carbon monoxide and water vapor to the first reactor section through the inlet;
(c) contacting the stream with at least a portion of the catalyst disposed within the first reactor section;
(d) contacting the stream with at least a portion of the catalyst disposed within the second reactor section;
(d) exhausting the stream from the second reactor section through the outlet;
wherein the temperature of the stream in said second reator section is reduced by heat exchange with the coolant fluid.

A principle feature of the present invention is the addition of a cooled water gas shift catalyst bed after the first conventional water gas shift catalyst bed. At the inlet to the cooled water gas shift catalyst bed, the carbon monoxide concentration is only slightly above the equilibrium concentration. The equilibrium concentration of carbon monoxide decreases further as the gas is cooled. Since most of the reaction occurs at the higher temperatures where the catalyst activity is high, the volume of the cooled bed is much smaller than a second adiabatic water gas shift reactor would be. The configuration of the present invention makes it possible to reduce the carbon monoxide concentration to less than about 0.15% without the economic concerns that would necessarily exist with the use of a second conventional water gas shift catalyst bed.

Another embodiment of the present invention provides for two distinct water gas shift reactors connected in series, the first being conventional in nature and the second having means disposed therein to reduce the temperature of the gaseous reactant stream.

DETAILED DESCRIPTION OF THE PREFERRED EMBODIMENTS

Figure 1:
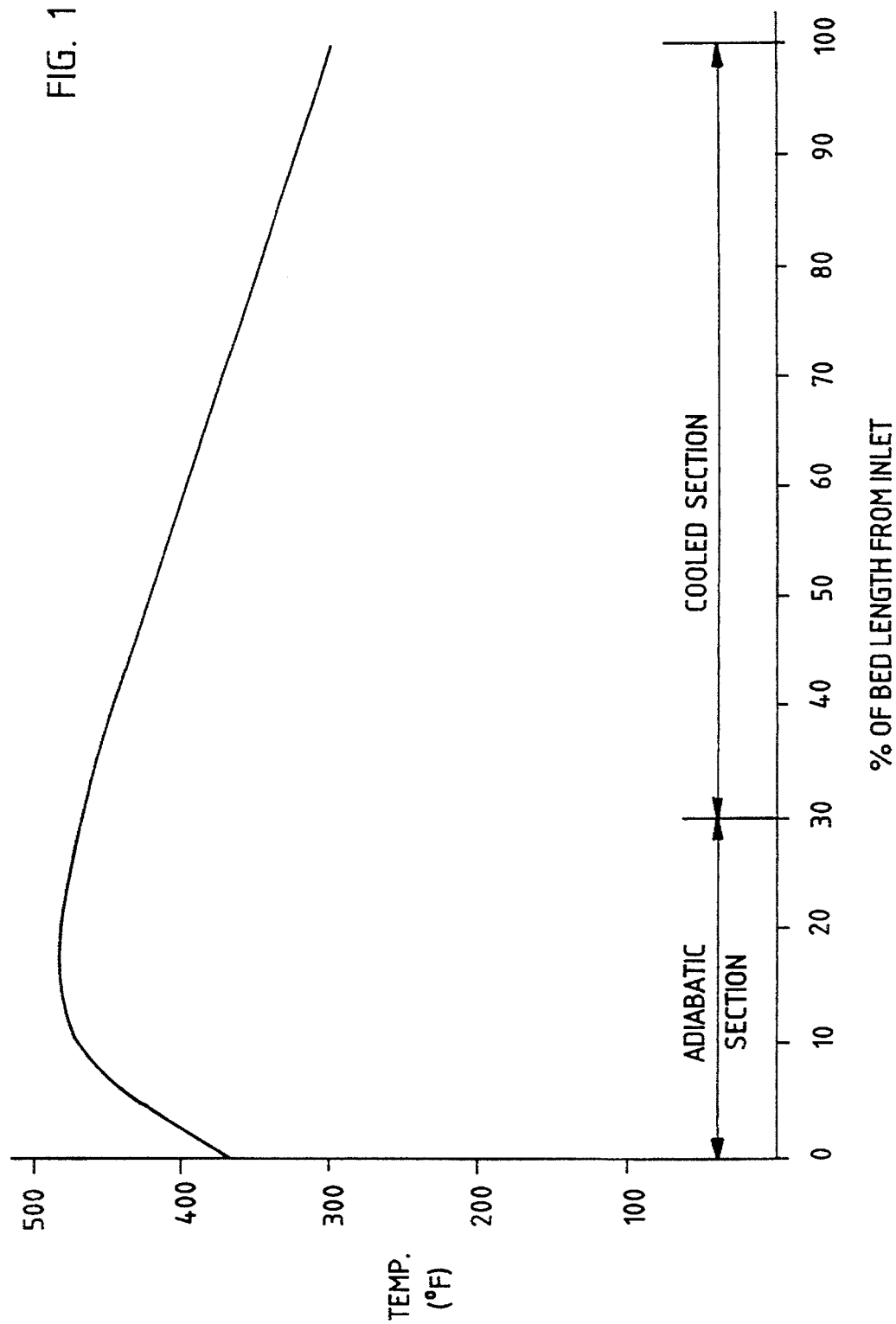
FIG. 1 is a plot of the shift temperature profile showing the temperature of the gaseous reactant stream as a function of catalyst bed length.

Turning first to FIG. 1, the plot shows a representative temperature profile of the water gas shift conversion process of the current invention. As illustrated in FIG. 1, the temperature of the gaseous reactant stream increases in the adiabatic portion of the water gas shift conversion process due to the exothermic nature of the water gas shift reaction. The gaseous reactant stream then enters the cooled portion of the water gas shift conversion process wherein the fluid reactant stream is progressively cooled until it leaves the conversion process.

Figure 2:
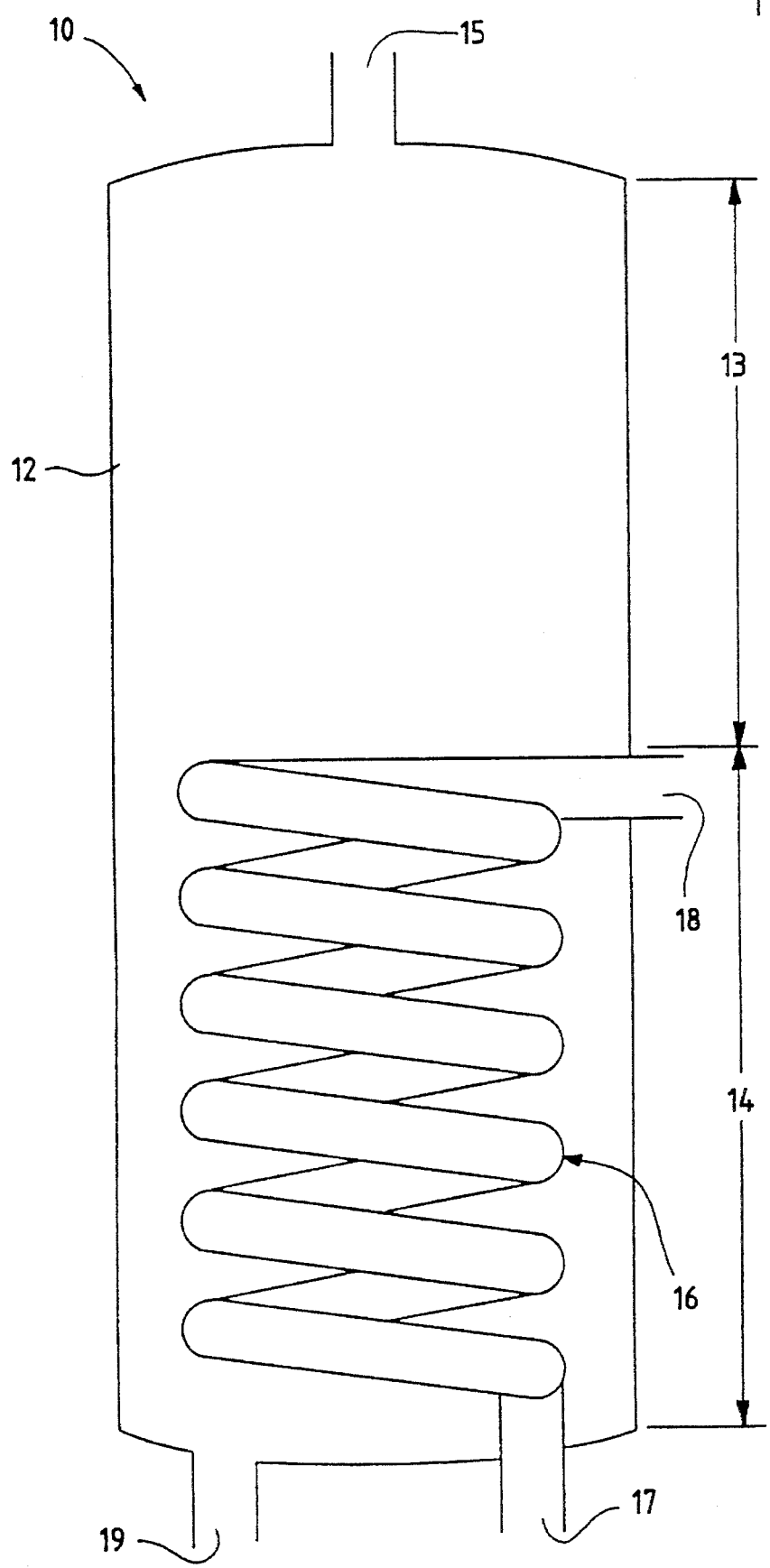
FIG. 2 is an axial sectional view of the single reactor embodiment of the two-stage water gas shift conversion apparatus of the present invention.

Turning now to FIG. 2, a single reactor embodiment of the two-stage water gas shift conversion apparatus is shown. The insulated reactor vessel 10 has disposed therein a catalyst bed 12 which contains a suitable water gas shift catalyst (not shown). Catalyst bed 12 is divided into two sections, namely, conventional section 13 and cooled section 14. A gaseous reactant stream comprising carbon monoxide and water vapor enters water gas shift reactor 10 through inlet 15 at a temperature from about 350° F. to about 450° F. If the gaseous reactant stream comprises reformate gas, it will typically contain from about 8% to about 12% carbon monoxide by volume. The gaseous reactant stream flows through conventional section 13 of catalyst bed 12, where the heat of the catalyzed reaction increases the temperature of the gaseous reactant stream to from about 490° F. to about 560° F. In conventional section 13, the carbon monoxide concentration of the gaseous reactant stream is reduced to from about 0.4% to about 1.2% by volume. The gaseous reactant stream then enters cooled section 14 of catalyst bed 12. Cooled section 14 is in a heat exchange relationship with coolant fluid flowing in coil 16. The coolant fluid enters coil 16 through coil inlet 17 and exits coil 16 through coil outlet 18. In cooled section 14, the temperature of the gaseous reactant is reduced according to the shift temperature profile of the cooled catalyst bed section depicted in FIG. 1. In cooled section 14, the catalyzed water gas shift conversion reaction occurs further as the temperature of the gaseous reactant stream is reduced. The gaseous reactant stream typically has a carbon monoxide concentration from about 0.06% to about 0.14% as it exits water gas shift reactor 10 through outlet 19. Upon exiting the water gas shift reactor 10, the temperature of the gaseous reactant stream is in the range from about 250° F. to about 350° F.

Figure 3:
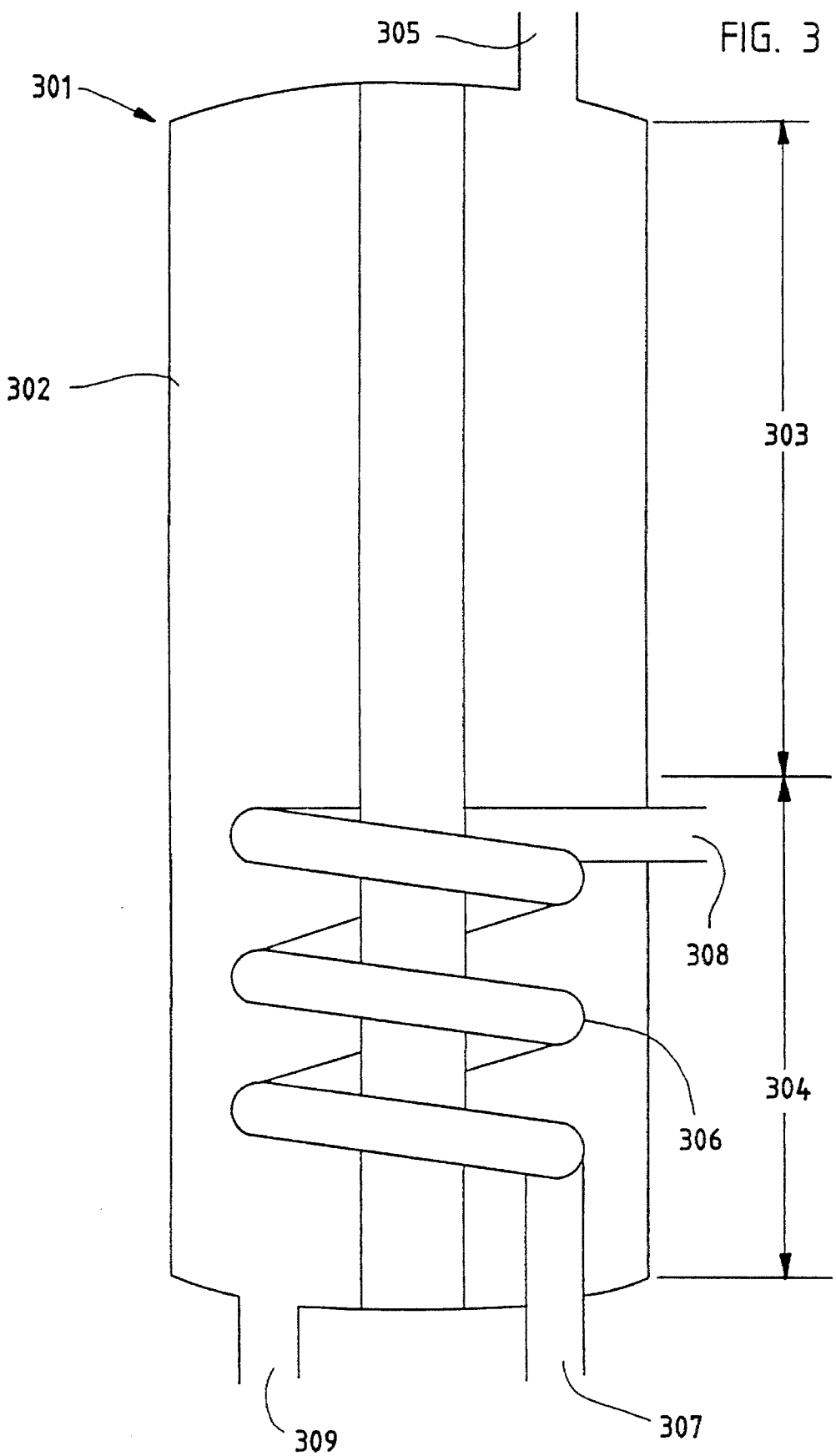
FIG. 3 is an axial sectional view of the single reactor embodiment of the two-stage water gas shift conversion apparatus of the present invention, in which an annular catalyst bed is employed.

Turning now to FIG. 3, insulated water gas shift reactor 301 has disposed therein an annular catalyst bed 302. A gaseous reactant stream comprising carbon monoxide and water vapor enters water shift gas reactor 301 through water gas shift reactor inlet 305 at a temperature in the range from about 350° F. to 450° F. If reformate gas is used as the gaseous reactant stream, then the reactant stream typically further comprises hydrogen, methane, carbon dioxide and carbon monoxide in the range from about 8% to about 12% by volume. The gaseous reactant stream flows through conventional catalyst bed section 303, where the temperature of the gaseous reactant stream increases to about 490° F. to about 560° F. due to the exothermic nature of the water gas shift reaction. Upon exiting catalyst bed section 303, the gaseous reactant stream typically has a carbon monoxide concentration from about 0.6% to about 1.2% by volume. Cooled section 304 is in heat exchange relationship with the coolant fluid flowing through coil 306. The coolant fluid enters through coil inlet 307 and exits through coil outlet 308. As the gaseous reactant stream passes through cooled section 304, the temperature of the gaseous reactant stream is reduced according to the shift temperature profile of the cooled reactor section illustrated in FIG. 1. In cooled section 304, the temperature of the gaseous reactant stream is preferably reduced to from about 250° F. to about 350° F. The carbon monoxide concentration of the gaseous reactant stream exiting water gas shift reactor 301 through water gas shift reactor outlet 309 is typically in the range from about 0.06% to about 0.14% by volume.

Figure 4:
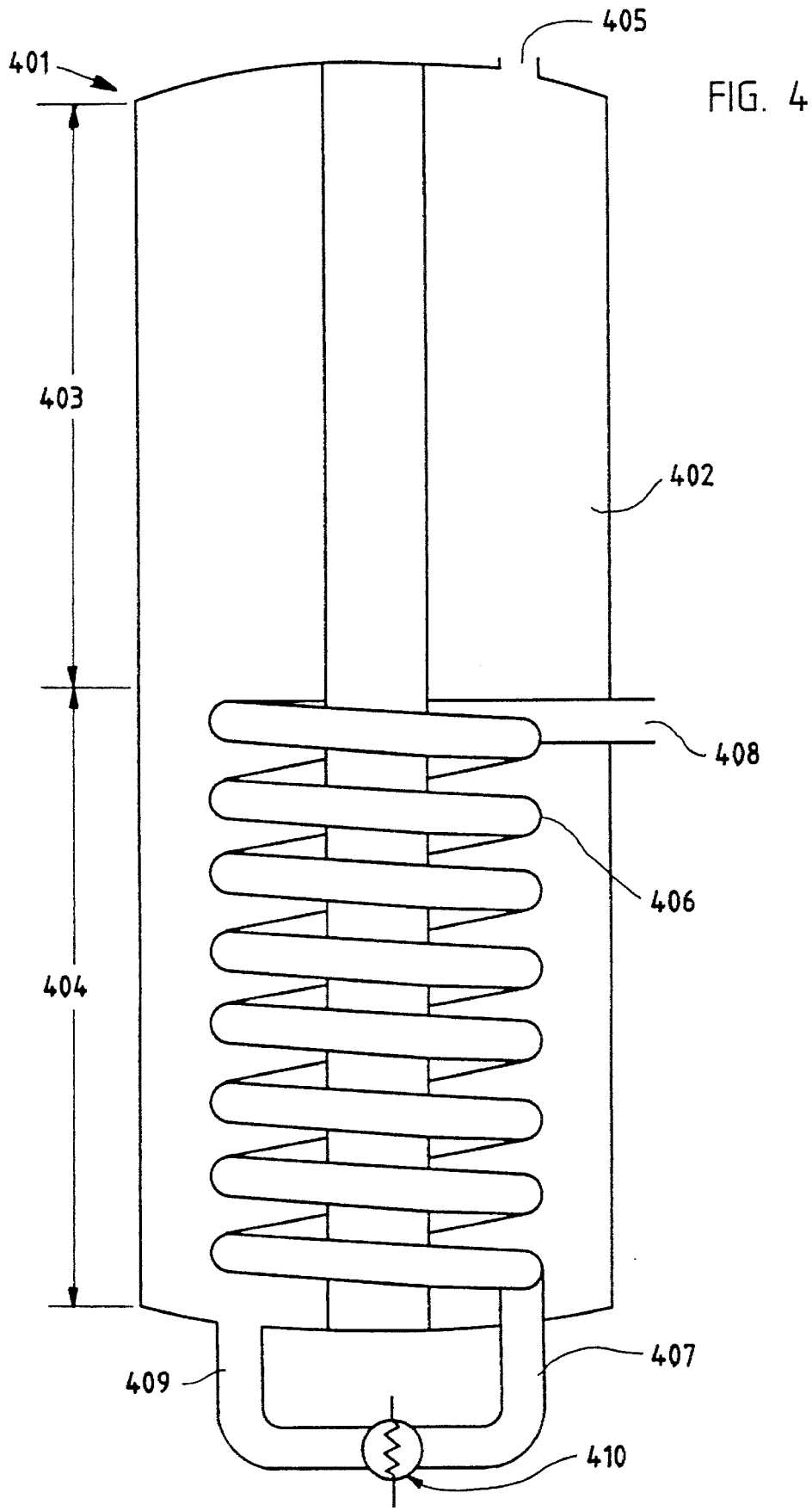
FIG. 4 is an axial sectional view of the single reactor embodiment of the two-stage water gas shift conversion apparatus of the present invention, in which an annular catalyst bed is employed and the gaseous reactant stream is employed as the coolant for the cooled water gas shift catalyst bed.

FIG. 4 illustrates an embodiment of the two-stage water gas shift conversion apparatus in which the gaseous reactant stream serves as the coolant fluid employed in the cooled catalyst bed. In FIG. 4, the gaseous reactant stream enters water gas shift reactor 401 through inlet 405. Annular catalyst bed 402 has a conventional section 403 and a cooled section 404. The gaseous reactant gas stream, which preferably comprises from about 8% to about 12% carbon monoxide by volume, enters conventional section 403 through inlet 405 at a temperature in the range from about 350° F. to about 450° F. As the gaseous reactant stream flows through conventional section 403, the heat of reaction increases the temperature of the gaseous reactant stream to from about 490° F. to about 560° F., as the carbon monoxide concentration of the gaseous reactant stream is reduced to a range from about 0.6% to about 1.2% by volume. The gaseous reactant stream then enters cooled section 404, where the temperature of the gaseous reactant stream is reduced to a range from about 250° F. to about 350° F. as the gaseous reactant stream passes through cooled section 404. At the same time, the carbon monoxide concentration of the gaseous reactant stream is further reduced to a range from about 0.06% to about 0.14% by volume. Cooled section 404 is in heat exchange relationship with coolant fluid directed through coil 406.

An important feature of cooled section 404 illustrated in FIG. 4 is the use of the gaseous reactant stream as the coolant fluid in cooled section 404. After passing through cooled section 404, the gaseous reactant stream leaves water gas shift reactor 401 through outlet 409. The gaseous reactant stream then passes through heat exchanger 410, where its temperature is further reduced to about 200° F. The gaseous reactant stream then enters coil inlet 407, flows through coil 406 located in cooled section 404, and exits coil 406 through coil outlet 408. In this manner, the embodiment of the water gas shift conversion apparatus illustrated in FIG. 4 is fully integrated such that coolant fluid needed from an external source is not required to remove heat directly from cooled section 404.

Figure 5:
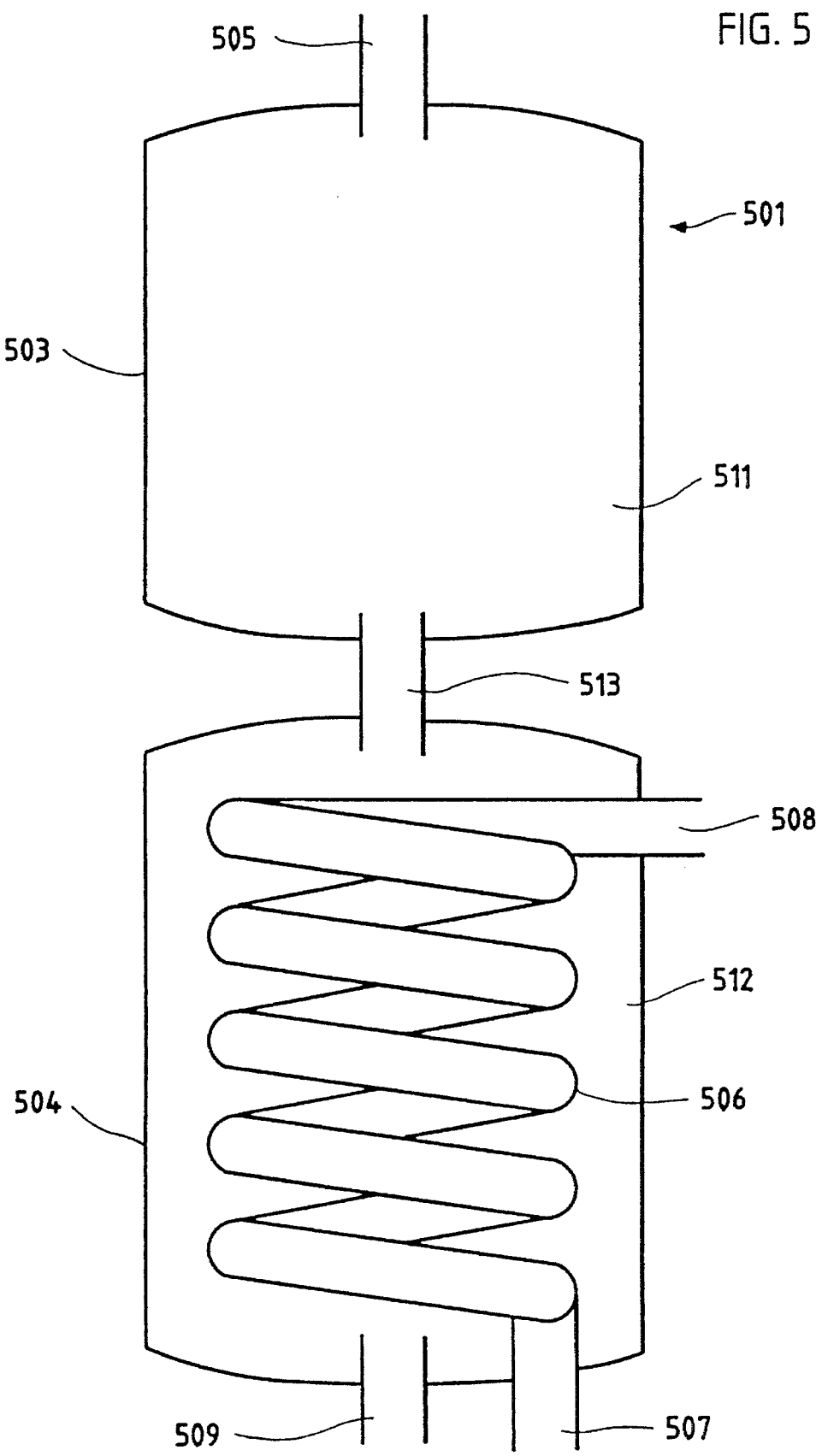
FIG. 5 is an axial sectional view of the dual reactor embodiment of the two-stage water gas shift conversion apparatus of the present invention.

FIGS. 5–9 illustrate additional embodiments of the water gas shift conversion apparatus in which two separate water gas shift reactors are employed in series. In these embodiments, the first water gas shift reactor comprises a conventional catalyst bed containing a quantity of a suitable water gas shift catalyst, and the second water gas shift reactor comprises a cooled catalyst bed containing a further quantity of a suitable water gas shift catalyst. In FIG. 5, the conventional shift reactor 503 of apparatus 501 has a catalyst bed 511 disposed therein. Gaseous reactant stream enters reactor 503 through inlet 505. The gaseous reactant stream flows through catalyst bed 511 disposed within reactor 503, where the concentration of carbon monoxide is typically reduced to a level in the range from about 0.6% to about 1.2% by volume. The gaseous reactant stream then enters cooled water gas shift reactor 504 through inlet 513. Catalyst bed 512 disposed within reactor 504 is in heat exchange relationship with a coolant fluid which flows through coil 506. As the coolant fluid flows through coil 506 from inlet 507 to outlet 508, the temperature of the gaseous reactant stream in reactor 504 is typically reduced to a range from about 250° F. to about 350° F., according to the shift temperature profile of the cooled water gas shift reactor illustrated in FIG. 1. As the temperature of the gaseous reactant stream is reduced in cooled water gas shift reactor 504, the carbon monoxide concentration of the gaseous reactant stream is further reduced to a range from about 0.06% to about 0.14% by volume. As shown in FIG. 5, the gaseous reactant stream exits reactor 504 through outlet 509.

Figure 6:
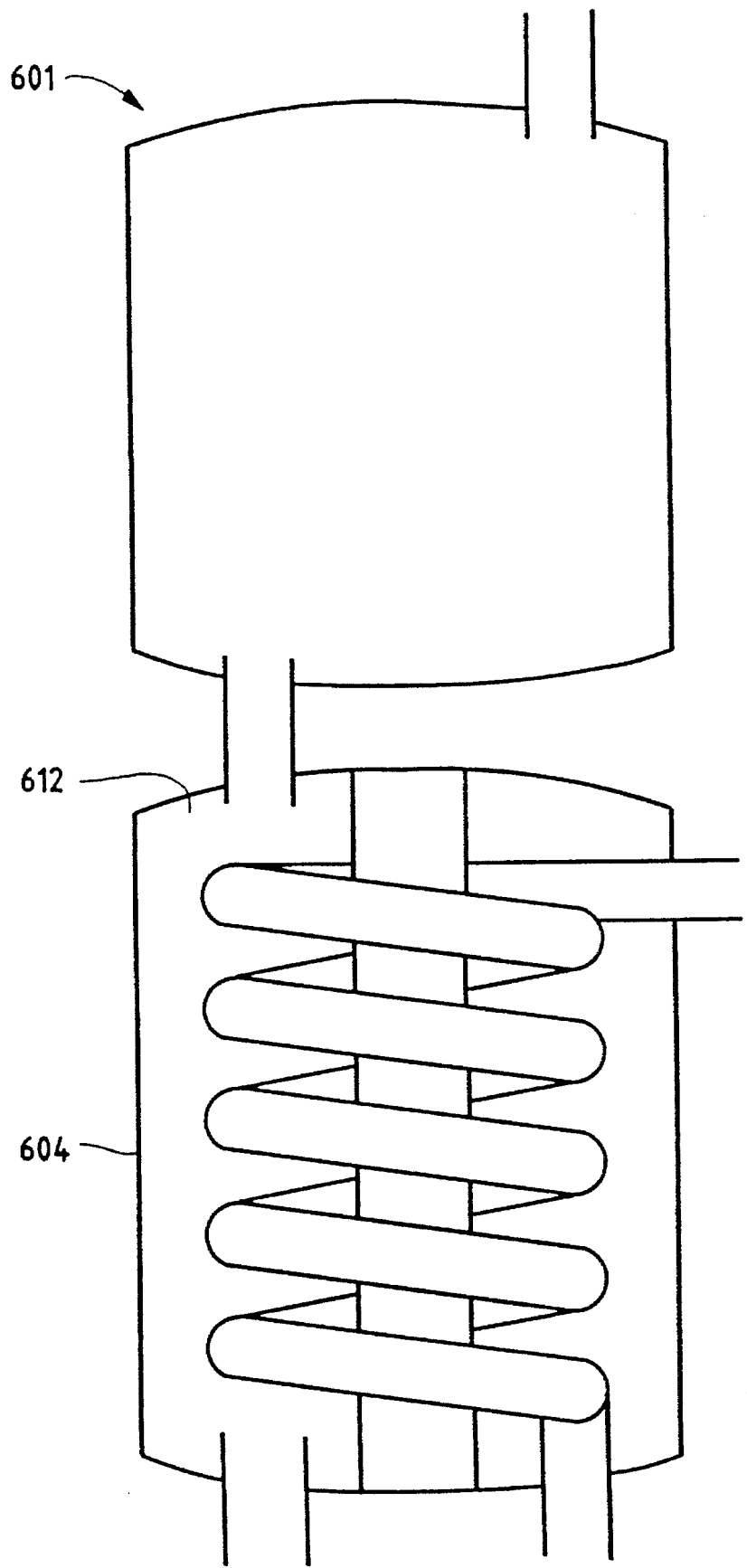
FIG. 6 is an axial sectional view of the dual reactor embodiment of the two-stage water gas shift conversion apparatus of the present invention, in which the cooled water gas shift reactor has an annular catalyst bed.

FIG. 6 is an embodiment of a water gas shift conversion apparatus 601 which is substantially identical to apparatus 501 of FIG. 5, with the exception that the catalyst bed 612 of the cooled water gas shift reactor 604 is annular.

Figure 7:
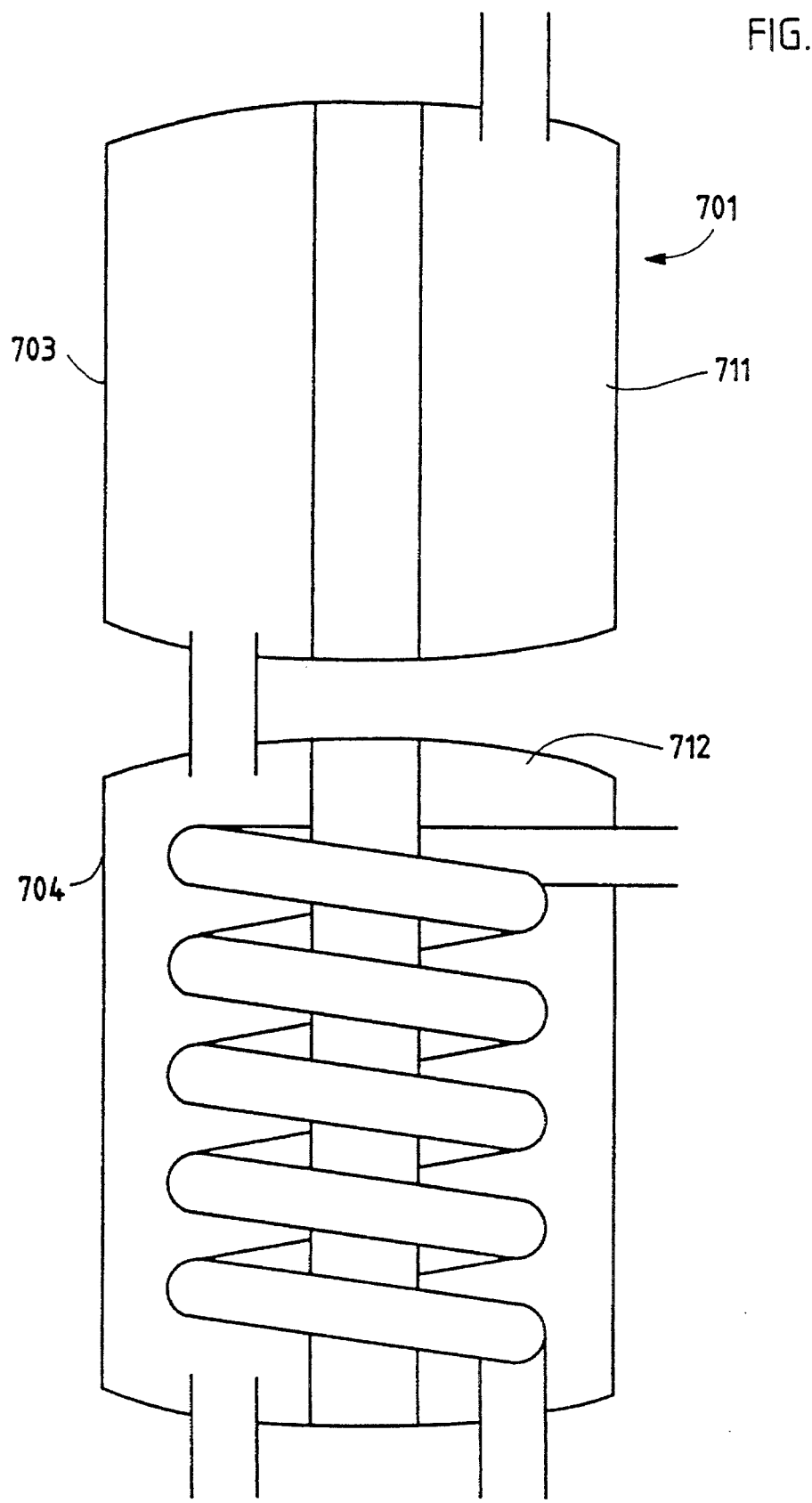
FIG. 7 is an axial sectional view of the dual reactor embodiment of the two-stage water gas shift conversion apparatus of the present invention, in which both the conventional and cooled water gas shift reactors have annular catalyst beds.

FIG. 7 is an embodiment of a water gas shift conversion apparatus 701 which is substantially identical to apparatus 501 of FIG. 5, with the exception that the catalyst beds 711, 712 of both the conventional water gas shift reactor 703 and the cooled water gas shift reactor 704, respectively, are annular.

Figure 8:
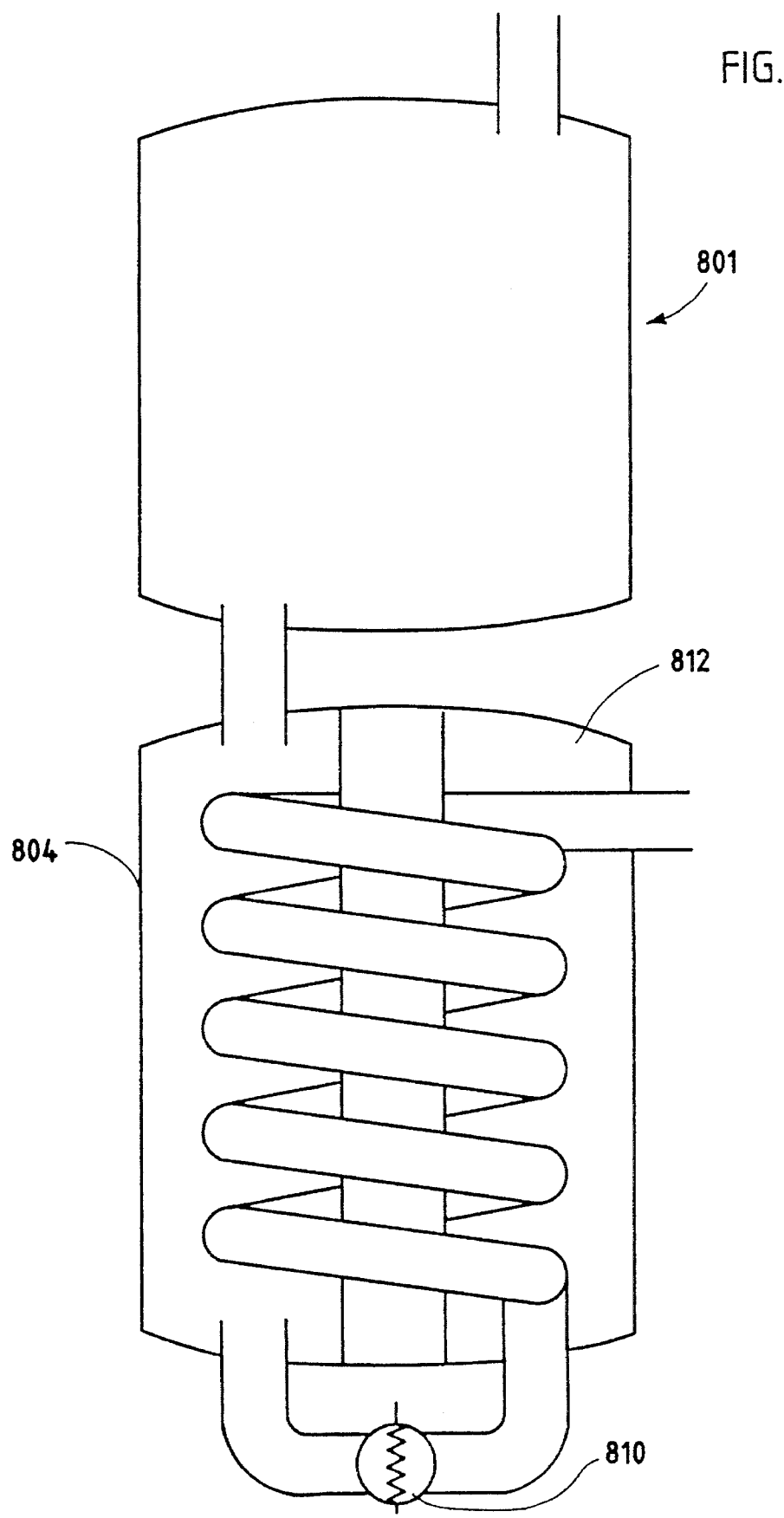
FIG. 8 is an axial sectional view of the dual reactor embodiment of the two-stage water gas shift conversion apparatus of the present invention, in which the cooled water gas shift reactor has an annular catalyst bed and the gaseous reactant stream is employed as the coolant.

FIG. 8 is an embodiment of a water gas shift conversion apparatus 801 which is substantially identical to apparatus 501 of FIG. 5, with the exception that the catalyst bed 812 contained in the cooled water gas shift reactor 804 is annular and the gaseous reactant stream exiting the cooled water gas shift reactor 804 is directed through a heat exchanger 810 and then used as the coolant fluid for the cooled shift reactor 804.

Figure 9:
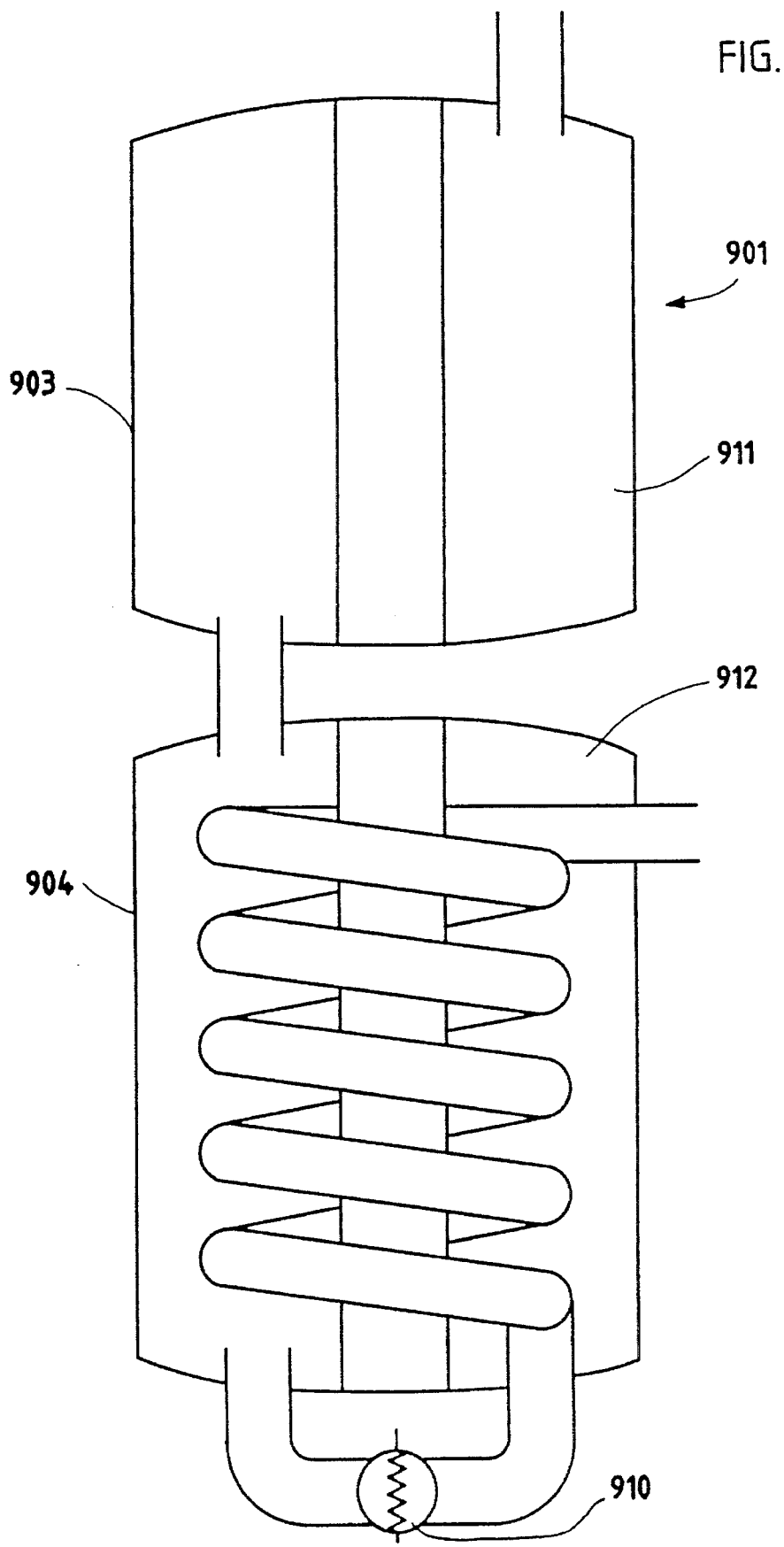
FIG. 9 is an axial sectional view of the dual reactor embodiment of the two-stage water gas shift conversion apparatus of the present invention in which both the conventional and cooled water gas shift catalyst beds are annular and in which the gaseous reactant stream is employed as the coolant.

FIG. 9 is an embodiment of a water gas shift conversion apparatus 901 which is substantially identical to apparatus 501 of FIG. 5, with the exception that the catalyst bed 911 of the conventional water gas shift reactor 903 and the catalyst bed 912 of the cooled shift reactor 904 are both annular and the gaseous reactant stream exiting the cooled water gas shift reactor 904 is directed through a heat exchanger 910 and then used as the coolant fluid for the cooled water gas shift reactor 904.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A water gas shift conversion method comprising the steps of:
   (a) providing a water gas shift reactor comprising:
      (1) a first reactor section having an inlet and a first quantity of catalyst disposed therein, said catalyst promoting a water gas shift reaction; and
      (2) a second reactor section in fluid communication with said first reactor section, said second reactor section having an outlet and a second quantity of catalyst disposed therein, said second reactor section in heat exchange relationship with a coolant fluid directed through a conduit within said second reactor section;
   (b) introducing a gaseous reactant stream comprising carbon monoxide and water vapor to said first reactor section through said inlet;
   (c) contacting said stream with at least a portion of the catalyst disposed within said first reactor section;
   (d) contacting said stream with at least a portion of said catalyst disposed within said second reactor section;
   (e) exhausting said stream from said second reactor section through said outlet;
   (f) directing at least a portion of said stream from said second reactor section outlet through a heat exchanger, said heat exchanger having an inlet and an outlet, wherein the temperature of said stream is reduced between said heat exchanger inlet and said heat exchanger outlet;
   (g) directing said stream portion from said heat exchanger outlet to said conduit;
   wherein said coolant fluid comprises said stream and wherein the temperature of said stream in said second reactor section is reduced by heat exchange with said coolant fluid.

2. The method of claim 1 wherein said first reactor section is adiabatic.

3. The method of claim 1 wherein said first reactor section comprises an annular receptacle for containing said first quantity of catalyst.

4. A water gas shift conversion method comprising the steps of:
   (a) providing a first water gas shift reactor having an inlet, on outlet and a first quantity of catalyst disposed therein, said catalyst promoting a water gas shift reaction; and
   (b) providing a second water gas shift reactor having an inlet, an outlet and a second quantity of catalyst disposed therein, said second reactor in heat exchange relationship with a coolant fluid directed through a conduit within said second reactor;
   (c) introducing a gaseous reactant stream comprising carbon monoxide and water vapor to said first reactor through said first reactor inlet;

(d) contacting said stream with at least a portion of the catalyst disposed within said first reactor to produce a first processed stream at said first reactor outlet;

(e) introducing said first processed stream to said second reactor through said second reactor inlet; and (f) contacting said stream with at least a portion of the catalyst disposed within said second reactor to produce a second processed stream at said second reactor outlet;

(g) directing at least a portion of said second processed stream from said second reactor outlet through a heat exchanger, said heat exchanger having an inlet and an outlet, wherein the temperature of said second processed stream is reduced between said heat exchanger inlet and said heat exchanger outlet;

(h) directing said second processed stream portion from said heat exchanger outlet to said conduit;

wherein said coolant fluid comprises said second processed stream and wherein the temperature of said first processed stream in said second reactor is reduced by heat exchange with said coolant fluid.

5. The method of claim 4 wherein said first reactor is adiabatic.

6. The method of claim 4 wherein said first reactor comprises an annular receptacle for containing said first quantity of catalyst.

7. The method of claim 4 wherein said second reactor comprises an annular receptacle for containing said second quantity of catalyst.

* * * * *